F. H. REAM.
UNIVERSAL JOINT.
APPLICATION FILED JULY 1, 1918.
1,297,968.
Patented Mar. 18, 1919.
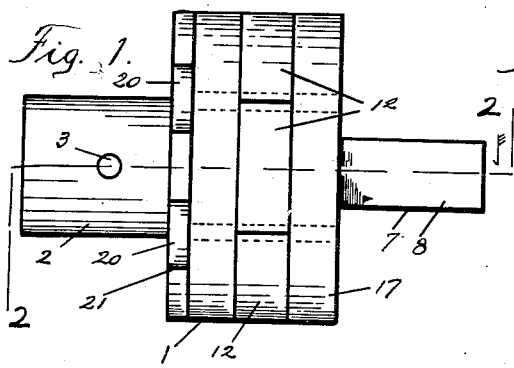
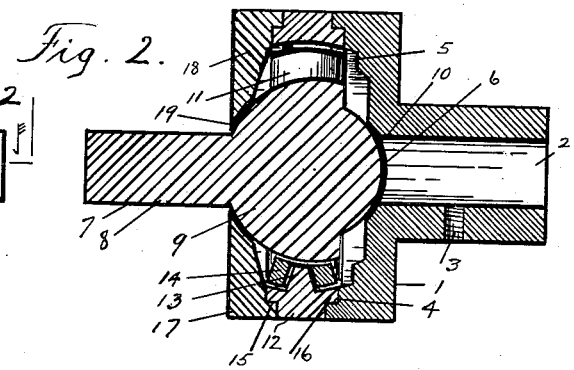
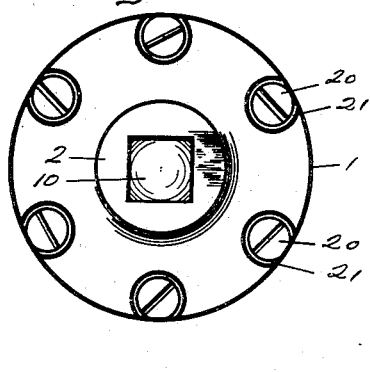
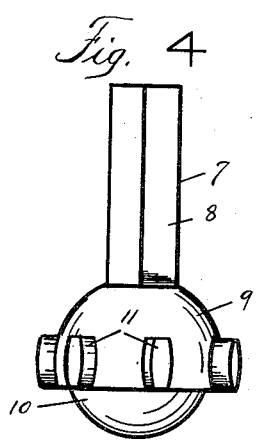
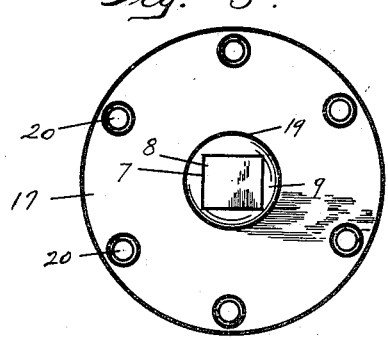
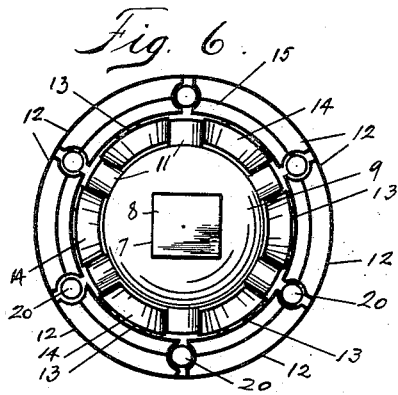
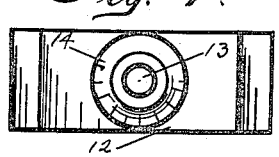
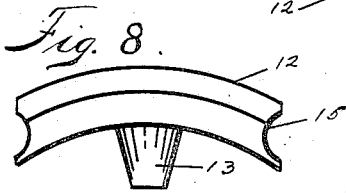
WITNESS:
A. S. Coates
Ernest E. Hall
INVENTOR.
Fred H. Ream.
BY
M. C. Gillham
ATTORNEY.

UNITED STATES PATENT OFFICE.

FRED H. REAM, OF KANSAS CITY, MISSOURI, ASSIGNOR TO R-S MANUFACTURING COMPANY, OF KANSAS CITY, MISSOURI.

UNIVERSAL JOINT.

1,297,968.　　　　Specification of Letters Patent.　　Patented Mar. 18, 1919.

Application filed July 1, 1918.　Serial No. 242,733.

*To all whom it may concern:*

Be it known that I, FRED H. REAM, a citizen of the United States, residing at Kansas City, in the county of Jackson and State of Missouri, have invented a new and useful Universal Joint, of which the following is a specification.

My invention relates to universal joints of the class described in the United States Patent No. 1,262,561, dated April 9, 1918, and issued to me for universal joints.

The object of my invention is to improve and simplify the construction of the universal joint, first, by the provision of individual segmental sections of a ring and each provided with an integral cone shaped stud having a cone-shaped roller movably mounted thereon, to provide facility for quick repair of bearing parts, second, by the provision of a convexed bearing portion of lesser radius than the spherical body of the flexible member, to obtain greater flexibility in the latter, third, by the provision of radially projecting cogs integral with the flexible member and having convexed sides to engage the cone shaped rollers, and fourth, by the provision of a lock ring or cup which is adapted to be combined with the joint to hold the segmental ring in place and hold the parts operatively assembled.

I attain these objects by means of the mechanism and combination of parts illustrated in the accompanying drawing, in which—Figure 1, is a side elevation of a universal joint constructed in accordance with my invention; Fig. 2, is a horizontal section of the same, on the line 2—2, in Fig. 1; Fig. 3, is an end view of the joint, and showing the bolts in the cup member for holding the parts assembled; Fig. 4, is an elevation of the flexible member, and showing the convexed and radially extending cogs and the convexed bearing thereon; Fig. 5, is an end view of the joint, and showing the lock ring combined with the joint and held by the bolts; Fig. 6, is a top plan view of the segmental ring, and showing the cone-shaped rollers in operative position and in engagement with the cogs on the flexible member; Fig. 7, is a view of the inner side of the individual segment, and showing the cone-shaped stud and roller thereon, also showing the cut away ends of the segment to receive the stay bolts, and Fig. 8, is a view of the upper edge of the individual segment, and showing the cone-shaped stud for receiving the roller.

Similar numerals of reference refer to corresponding parts throughout the several views.

1, is a cup-shaped member having a hollow extension 2, which is adapted for receiving a shaft. A hole 3, is apertured transversely in the extension and communicates with the interior thereof and is adapted to receive a set screw. A portion of the inner side of the rim of the cup member is cut away to form an annular shoulder 4, and inwardly of the latter a shoulder 5. The central portion of the bottom of the cup is formed concave to provide a bearing for a flexible member 7, comprising a stub shaft 8, having at its one end a spherical portion 9, having a concentric portion of lesser radius to form a bearing 10, which is adapted to bear on the concaved portion 6, at the bottom of the cup member 1, the flexible member being adapted to move freely in the cup. A plurality of radially extending convexed cogs 11, are formed integral with the spherical portion 9, of the flexible member and at regular intervals circumferentially thereof, the sides of the respective cogs being convexed. A plurality of segments 12, provided with inwardly extending cone-shaped studs 13, having cone-shaped rollers 14, movably mounted thereon, are provided with annular shoulders 15 and 16, and their end portions are cut away in inwardly curved line to permit the passage of stay bolts therethrough. The segments 12, are mounted on the cup member, with the lower shoulder 16, of the segments bearing on the shoulder 4, on the cup member, and thereby forming of the individual segments a sectional ring interlocked with the cup member. The segments are so arranged that the cone-shaped rollers 14, shall lie between the cogs 11, on the flexible member and in engagement therewith. A lock ring 17, provided with an annular shoulder 18, is mounted on the segmental ring of rollers, the shoulder 18, being engaged by the shoulders 15, on the upper edge of the individual segments, whereby the flexible member is confined in the cup member and its cogs 11, held in engagement with the rollers 14, on the segments 12. An opening 19, is formed in the lock ring 17, through which opening the shaft 8, of the flexible member passes, the border of said opening being formed concentrically with the spherical portion 9, to provide a bearing for the latter. Stay bolts 20, are extended through the outer margin of the cup member and through the lock ring, the intermediate portions of the bolts being received by the cut away end portions of the segments 12; the heads of the bolts are counter sunk in the outer side of the cup member, as shown at 21, in Figs. 1 and 3. The sides of segments 12 and rollers 14, are formed concentric with the spherical body 9, of the flexible member.

The flexible member in the joint embodying my invention, is adapted for deflective movements from straight alinement and without impairing its capacity for receiving and imparting power. The provision of the interlocking segmental ring of rollers permits the economical and quick substitution of perfect rollers for defectives.

Having described my invention what I claim is—

A universal joint, comprising a cup shaped member, a flexible member movably mounted in said cup member, said flexible member comprising a shaft having a spherical body portion within the cup member and provided with a plurality of radially extending concentric cogs having convexed sides, a plurality of concentrically formed segments interlocked with said cup member and provided on their inner sides with cone shaped rollers in engagement with the cogs on the flexible member, and a concentrically formed locking ring interlocked with said segments and adapted to hold the body portion of the flexible member in said cup member.

Kansas City, Missouri, June 27th, 1918.

FRED H. REAM.

Witnesses:
DWIGHT M. SMITH,
GOODWIN CREASON.